United States Patent
Feng et al.

(10) Patent No.: US 9,594,893 B2
(45) Date of Patent: Mar. 14, 2017

(54) MULTI-TOUCH LOCAL DEVICE AUTHENTICATION

(71) Applicant: Lenovo (Singapore) Pte. Ltd., Singapore (SG)

(72) Inventors: Xin Feng, Arcadia, CA (US); James Anthony Hunt, Chapel Hill, NC (US); David Rivera, Raleigh, NC (US); Peter Carlson Rane, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 216 days.

(21) Appl. No.: 14/155,917

(22) Filed: Jan. 15, 2014

(65) Prior Publication Data

US 2015/0199504 A1  Jul. 16, 2015

(51) Int. Cl.
  *H04L 9/32* (2006.01)
  *G06F 21/36* (2013.01)
  *G06F 3/0488* (2013.01)
  *G06F 3/0484* (2013.01)

(52) U.S. Cl.
  CPC ............ *G06F 21/36* (2013.01); *G06F 3/0484* (2013.01); *G06F 3/04883* (2013.01); *G06F 2203/04808* (2013.01)

(58) Field of Classification Search
  CPC .................................................. H04L 9/0838
  See application file for complete search history.

(56) References Cited

U.S. PATENT DOCUMENTS

| | | | | |
|---|---|---|---|---|
| 8,665,238 | B1* | 3/2014 | Gossweiler, III | G06F 3/0488 345/173 |
| 9,170,730 | B2* | 10/2015 | Choi | G06F 3/04847 |
| 2006/0125803 | A1* | 6/2006 | Westerman et al. | 345/173 |
| 2008/0122658 | A1* | 5/2008 | Salman | G06F 3/04897 341/22 |
| 2009/0249258 | A1* | 10/2009 | Tang | 715/863 |
| 2010/0225443 | A1* | 9/2010 | Bayram et al. | 340/5.83 |
| 2012/0133484 | A1* | 5/2012 | Griffin | 340/5.54 |
| 2013/0162582 | A1* | 6/2013 | Hatano | B60K 37/06 345/173 |
| 2013/0163026 | A1* | 6/2013 | Jung et al. | 358/1.13 |
| 2014/0362055 | A1* | 12/2014 | Altekar | G06F 3/0436 345/177 |
| 2015/0089435 | A1* | 3/2015 | Kuzmin | G06N 5/003 715/773 |
| 2015/0116353 | A1* | 4/2015 | Miura | G06T 11/60 345/632 |
| 2015/0277698 | A1* | 10/2015 | Pakhchanian | G06F 3/0488 715/863 |

* cited by examiner

*Primary Examiner* — Josnel Jeudy
(74) *Attorney, Agent, or Firm* — Ference & Associates LLC

(57) ABSTRACT

An embodiment provides a method, including: detecting, at a touch sensitive surface of an information handling device, user input including at least one multi-touch input; said detecting comprising detecting two or more substantially simultaneous user inputs to the touch sensitive surface; associating, using a processor, a number with the at least one multi-touch input; determining, using the processor, if the user input matches expected user input; and responsive to determining a match, authenticating a user. Other embodiments are described and claimed.

20 Claims, 4 Drawing Sheets

MULTI-TOUCH LOCAL DEVICE AUTHENTICATION

BACKGROUND

Information handling devices ("devices") come in a variety of forms, for example laptop computing devices, tablet computing devices, smart phones, e-readers, and the like. Often users wish to protect access to a device or a component, function or asset of the device, e.g., a secured application.

Many authentication schemes are available for use in protecting a device or part thereof. Examples of user authentication increasingly include use of touch sensitive surfaces. By way of example, there currently exist methods to authenticate a user via pin input to a touch screen display and to authenticate a user based on a particular swipe pattern input on a touch screen display.

BRIEF SUMMARY

In summary, one aspect provides a method, comprising: detecting, at a touch sensitive surface of an information handling device, user input including at least one multi-touch input; said detecting comprising detecting two or more substantially simultaneous user inputs to the touch sensitive surface; associating, using a processor, a number with the at least one multi-touch input; determining, using the processor, if the user input matches expected user input; and responsive to determining a match, authenticating a user.

Another aspect provides an information handling device, comprising: a touch sensitive surface that accepts user input; a processor; and a memory device that stores instructions accessible to the processor, the instructions being executable by the processor to: detect, at the touch sensitive surface, user input including at least one multi-touch input; wherein to detect comprises detecting two or more substantially simultaneous user inputs to the touch sensitive surface; associate a number with the at least one multi-touch input; determine if the user input matches expected user input; and responsive to determining a match, authenticate a user.

A further aspect provides a product, comprising: a storage device having processor executable code stored therewith, the code comprising: code that detects, at a touch sensitive surface of an information handling device, user input including at least one multi-touch input; wherein to detect comprises detecting two or more substantially simultaneous user inputs to the touch sensitive surface; code that associates, using a processor, a number with the at least one multi-touch input; code that determines, using the processor, if the user input matches expected user input; and code that, responsive to determining a match, authenticates a user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
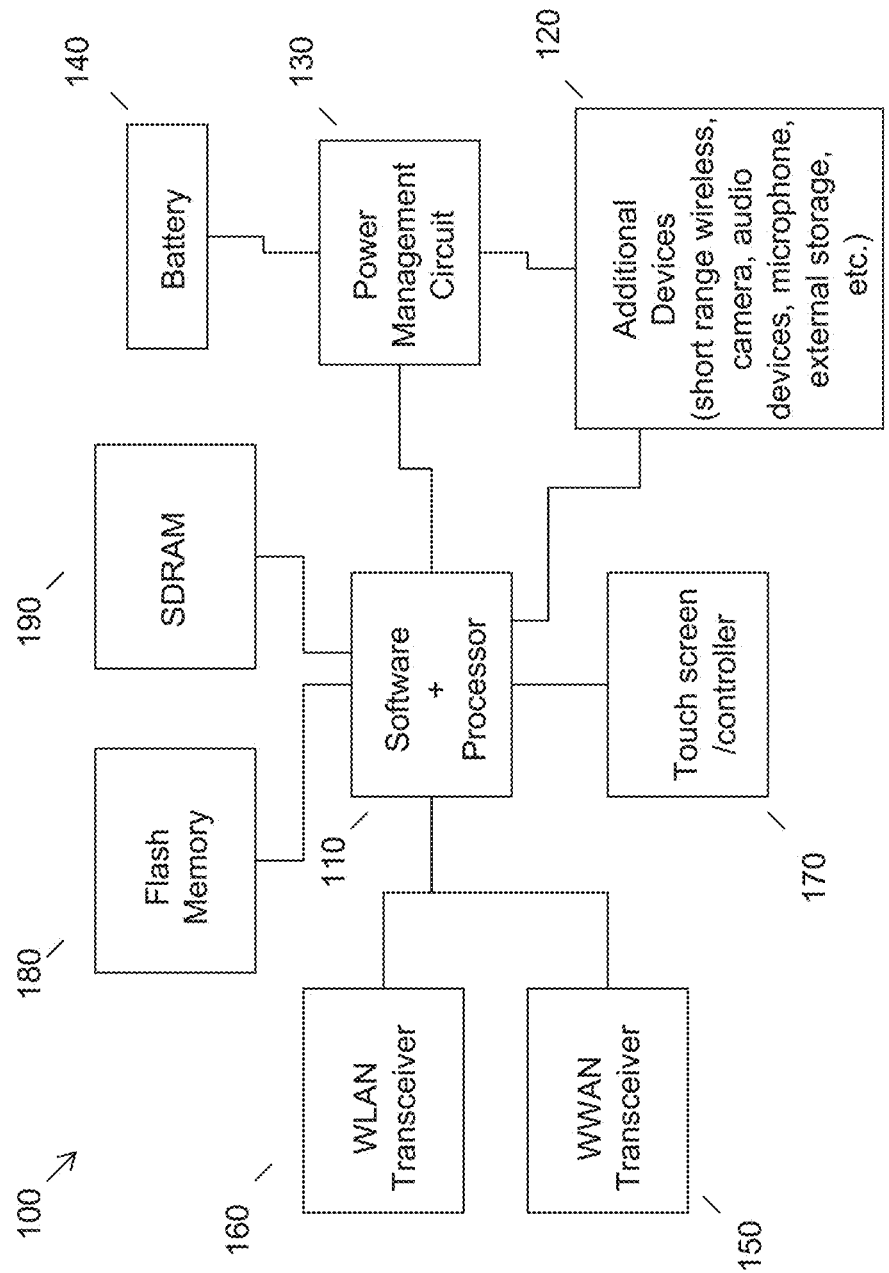
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While certain authentication schemes have been developed that include the use of a touch sensitive surface, there remains a need to create more intuitive, yet secure local authentication methodology. Traditional text-based/number-based password techniques introduce a cognitive burden for the user. A user also has to physically reach or interact with the system user interface at certain location(s) (e.g., in the case of an unlock screen and number pad display, etc.). This imposes usability and accessibility challenges, e.g., because a user has to input a code at a specific location.

There are existing, dedicated biometric devices/readers (e.g., a fingerprint reader, a retina scanner, etc.) that provide local authentication without requiring memory of the password. However, such biometric readers require additional costs and also introduce additional system weight and design (e.g., dimension) implications, making those devices unattractive solutions in some respects.

Certain techniques have been developed to incorporate easy to remember logins using touch based technology. For example, Microsoft WINDOWS operating system includes a picture password feature, which allows a user to provide a combination of actions such as drawing (on a touch screen display or other touch sensitive surface) a circle, a straight line and providing a tap on a particular location within a picture as password. While this methodology does not introduce additional cost/size burden, it requires user to memorize the actions and the ordering thereof. The security level of this methodology has also not been validated. WINDOWS is a registered trademark of Microsoft Corporation in the United States and other countries.

Accordingly, an embodiment provides for a multi-touch user input solution for user authentication. An embodiment works via user inputs provided to a touch sensitive surface available on many devices, include but are not limited to smart phones, tablets and laptops. Examples of touch sensitive surfaces providing an appropriate user interface include but are not limited to a capacitive touch pad, a capacitive touch pad with a force sensor, a pen digitizer, a capacitive pen, and a touch-screen.

According to an embodiment, a user provides multi-touch input. In an embodiment, a user provides a combination of multi-touch inputs. The multi touch input(s) is/are detected by a touch sensitive surface, e.g., as a tap input, a click input, a multi-finger gesture input, etc. An embodiment captures user such user inputs, extracts components of the user inputs, and uses these components to form a comparison representation for comparison with a known comparator for user authentication. The components of the user input used by an embodiment include but are not necessarily limited to a number of fingers used to provide one or more multi-touch inputs to the touch interface (e.g., on a touch screen, up to 10 fingers may be used to touch the screen), the type of touch event, e.g., which may include but not limited to a tap, a click, a press and hold (along with pressure detection), a swipe or a flick (including directionality thereof), gesture inputs such as zoom or rotate, etc.

For some touch events, such as swipe and flick, an embodiment thus may also detect the direction, such as left, right, up and down. Additionally, for a touch interface including a touch sensitive surface with a pressure sensor or other mechanism for detecting pressure, an embodiment may detect the force level of a user's touch action. The force level detection may be tailored to a suitable sensitivity, e.g., it may be represented as a numerical level of pressure, such as a user using one finger press at 620 grams force; or discrete information, such as user using one finger press within a generalized range, e.g., a "high" level of force, such as exceeding a predetermined threshold, etc. An embodiment may utilize combinations of above information/components, derived from a single touch event or multiple touch events provided in sequence, and thus use timing information as well (e.g., order of inputs, duration thereof, etc.).

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included. System 100 often includes a touch screen 170 for data input and display/rendering. System 100 also typically includes various memory devices, for example flash memory 180 and SDRAM 190.

Figure 2:
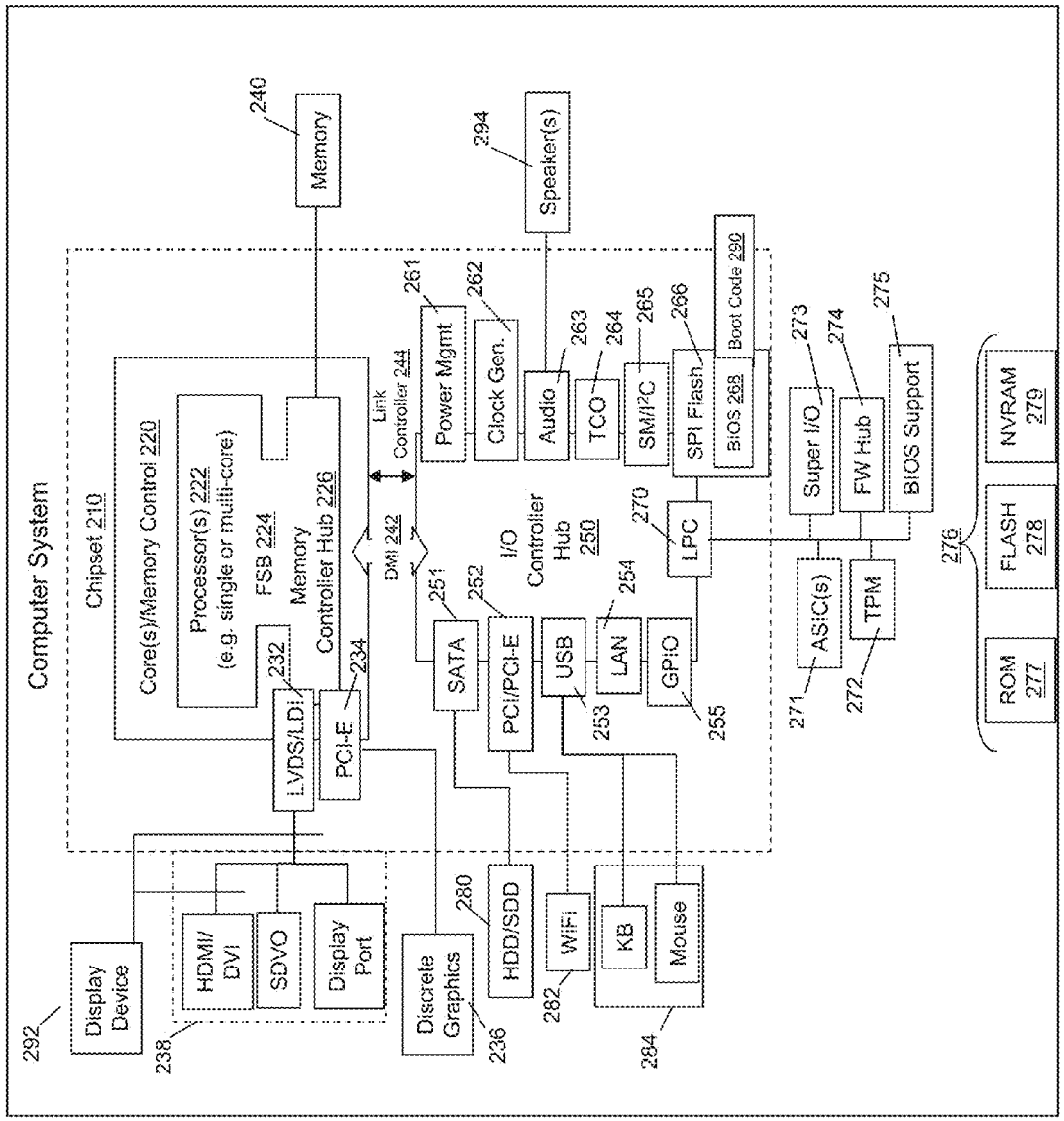
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may include a touch sensitive surface such as a touch pad, pen digitizer or touch screen, etc., used in user authentication, as described herein. An embodiment permits a user to easily employ a touch interface for user authentication such that the user is relieved from having to recall complex codes or perform intricate gestures to be authenticated, although more complex authentication is supported by various embodiments as will be appreciated from the non-limiting examples provided herein.

Figure 3:
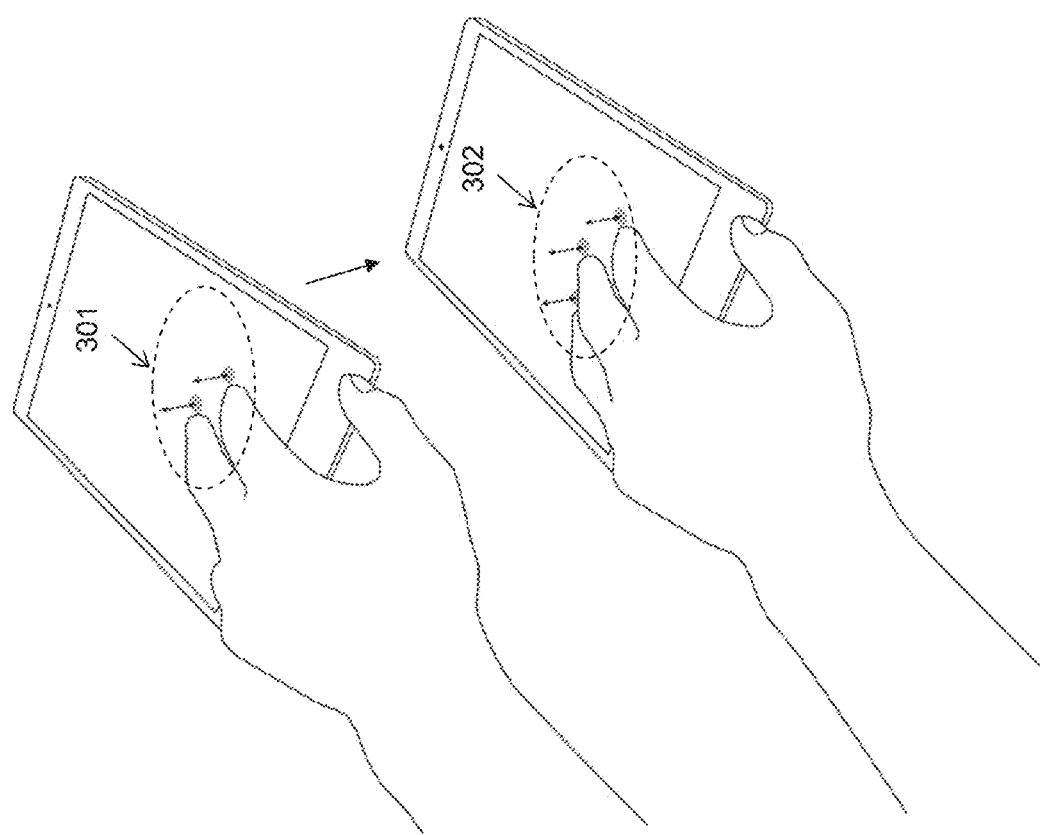
FIG. 3 illustrates an example of providing multi-touch input for user authentication.

In an embodiment, referring by way of example to FIG. 3, a user may provide a multi-touch input 301 to a touch sensitive surface, e.g., a touch screen of a tablet computing device as illustrated in FIG. 3. The user provides, for example, at least two points of contact as a multi-touch input 301 to the touch interface. An embodiment may thus detect the multiple contact points, here provided by a user's index and middle finger, although other fingers or objects may be used, e.g., a pen input in combination with a finger input, etc.

An embodiment may map the multi-touch input or otherwise associate it with a representation of the user input for comparison employed in an authentication procedure, e.g., a device login. For example, an embodiment may extract components of the multi-touch input 301 such as the fact that there are two points of contact, as opposed to three points of contact, a single point of contact, etc. An embodiment may map this extracted component or determined feature to a representation useful for a login procedure, e.g., the two points of contact of multi-touch 301 may be mapped to the numeral "2". Thus, a user may input via the touch interface a multi-touch that is interpreted as a number. Likewise, an embodiment may map or associate other multi-touch input (s), e.g., multi-touch input 302, with another representation, e.g., the number "3".

An embodiment may take into account other features of the user inputs provided to the touch interface and utilize the same in forming a representation for use in an authentication procedure. For example, an embodiment may extract timing information regarding the multi-touch inputs 301 and 302, e.g., noting that the order of their receipt was "2" and thereafter "3", e.g., using timing information collected in association with the multi-touch inputs 301 and 302. Thus, the representation formed by an embodiment based on these multi-touch inputs 301 and 302 may be "23", rather than "32", which is used as a representation to form comparison with a comparator, e.g., a previously entered pin of "23".

As will be appreciated, for increased security, an embodiment may, but need not necessarily, extract more features or components from the multi-touch inputs 301 and 302 and/or take into account more inputs in combination therewith. For example, additional features or components extracted from multi-touch inputs 301 and 302 may include, in addition to their order of receipt, but are not necessarily limited to, the length of each input (e.g., tap input versus press and hold input), the location of each input (e.g., centrally located, located near an edge, located within an underlying image displayed on the touch screen, located within a particular region of the touch screen, etc.), the pressure of the inputs, and the like. Inclusion of such other components or features may increase security, e.g., by providing additional information for comparison; however, if a user would like to increase the usability in terms of an easy to remember and perform authentication sequence, a user need not activate such features of an embodiment. For example, a user may select (e.g., via a user interface utility) to assign a user authentication based solely on a series, e.g., two or more, multi-touch inputs without reference to their location, pressure of input, etc. This allows a user to essentially tap a code using multi-touch input rather than entering a pin code from a number pad.

In addition to providing such multi-touch input(s), a user may provide additional touch inputs to the touch interface, e.g., swipe inputs, gesture inputs, etc., such that the authentication sequence becomes more complex. A user for example may implement this instead of a simpler authentication sequence or as an additional authentication sequence, e.g., for logging into a particular device sub-feature, e.g., an email or other messaging account.

By way of example, a user may incorporate a swipe touch input (e.g., up or down), a pinch or zoom gesture, or the like such that the multi-touch authentication sequence is made more complex to perform and thus replicate by an unauthorized user. As will be appreciated, the location, directionality, pressure and the like of such additional inputs may be taken into account by an embodiment to provide additional information used for authentication of a user. An embodiment consequently forms a corresponding representation based on the additional, perhaps complex, inputs, e.g., combined with the multi-touch inputs, for comparison with stored comparison information for the user authentication procedure. As will be understood, a user may perform an authentication sequence initially to train a device login.

Figure 4:
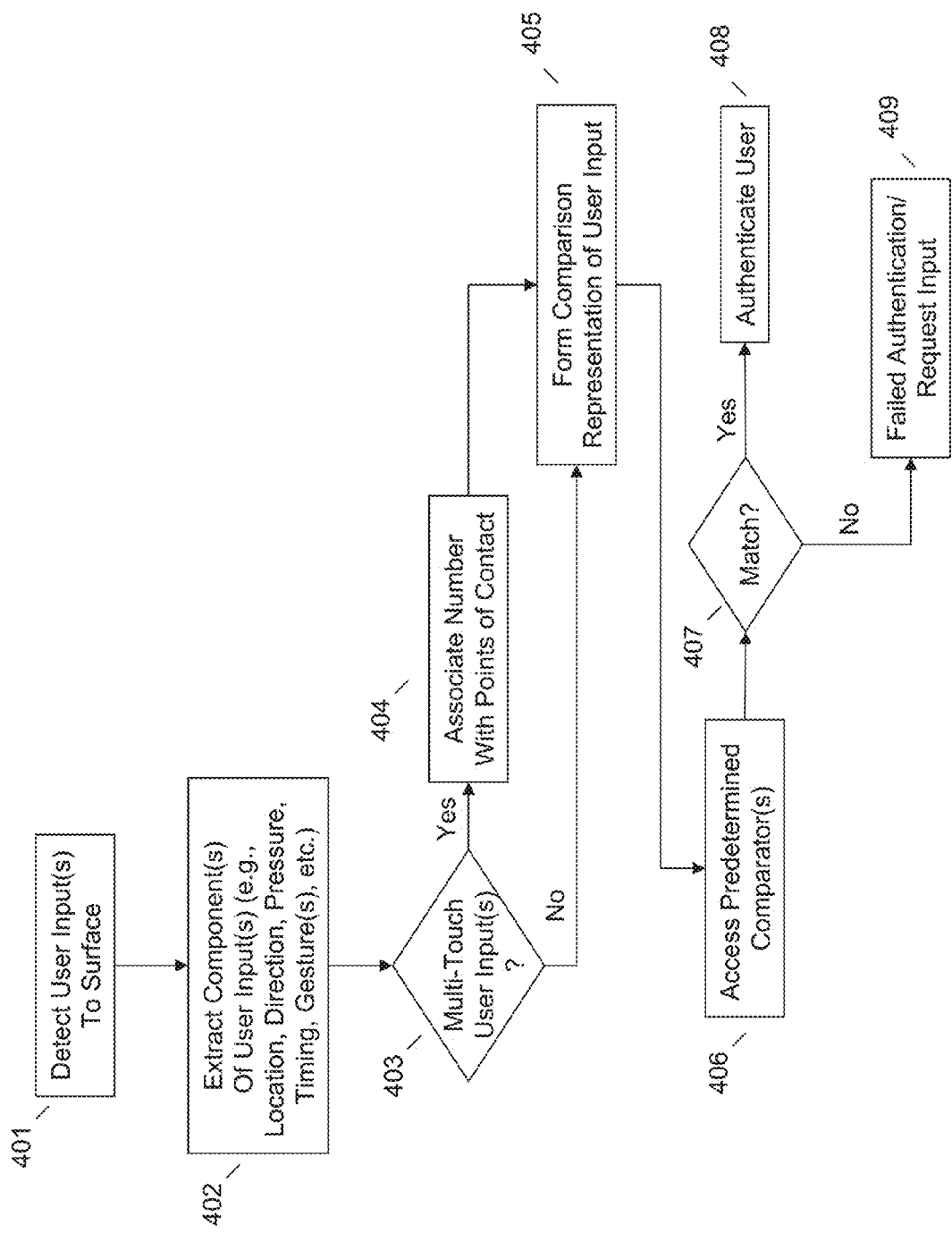
FIG. 4 illustrates an example method of multi-touch local device authentication.

Referring to FIG. 4, an example method of using multi-touch input for user authentication is illustrated. An embodiment detects user input(s) to a touch sensitive surface at 401, e.g., a user providing a multi-touch input to a touch screen of a tablet computing device or a smart phone. An embodiment then extracts components of the user inputs to form a comparison representation at 402. This may occur following an initial user input and repeat as the user sequentially provides inputs or may occur following a sequence of user inputs, e.g., that are buffered or stored temporarily in a memory device, e.g., prior to being processed.

In any event, an embodiment determines if at least one user input includes a multi-touch gesture at 403. If so, an embodiment associates a number therewith at 404, e.g., assigns a number to the multi-touch input of the user corresponding to the number of contacts provided simultaneously (or substantially simultaneously), e.g., a user tapping the touch screen with two fingers as illustrated in FIG. 3. As described herein, other gestures or touch inputs may be provided by a user and incorporated into the comparison representation formed at 405.

Having received user input from a touch interface, an embodiment forms a comparison representation at 405 such that the touch inputs of the user may be converted to a comparable form. As with the association of multi-touch inputs with numbers, other touch inputs and characteristics thereof, e.g., upward swipe gesture provided to a right edge of the touch screen, may likewise be represented in a summary fashion, e.g., with a numerical representation or the like. Additionally, a temporal component, such as speed or timing of the input(s) may be included in the input characteristics utilized. The combination of these representations may be used as a comparison representation that is then compared or matched to a comparator, for example accessed at 406, e.g., stored in a local memory of the device or elsewhere.

If the comparison representation matches a known comparator, e.g., created by the user in a training session, an embodiment may determine a match exists at 407 and authenticate the user at 408. This permits identification of an authorized user and may in turn lead to other actions, e.g., permitting access to the device or component/feature thereof. Otherwise, i.e., if there is no match made at 407, an embodiment may not authenticate the user and may request further input at 409, e.g., ask the user to try again.

Thus, an embodiment provides a convenient way for a user to be authenticated using multi-touch inputs. In certain embodiments, the multi-touch authentication sequence can be quite simple to remember and perform, thus enabling greater usability, particularly for users that find complex logins or authentications difficult. Moreover, such an authentication scheme both does not require additional, costly device components and may be supplemented with additional touch inputs (e.g., gesture inputs) to increase the security of the authentication, as may be desirable for some users and/or some contexts.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    detecting, at a touch sensitive surface of an information handling device, user input including at least one multi-touch input;
    said detecting comprising detecting two or more concurrent user inputs to the touch sensitive surface;
    associating, using a processor, a number with the at least one multi-touch input, the number being chosen based on the number of concurrent user inputs;
    thereafter performing, using the processor, a comparison of a sequence of numbers associated with a sequence of concurrent user inputs and a predetermined sequence of numbers; and
    providing, responsive to determining a match based on the comparison, an authentication of a user.

2. The method of claim 1, wherein:
    said detecting comprising detecting that the user input includes a directional component; and
    said performing a comparison includes matching the directional component with an expected directional component.

3. The method of claim 1, wherein:
    said detecting comprising detecting that the user input includes a force component; and
    said performing a comparison includes matching the force component with an expected force component.

4. The method of claim 1, wherein:
said detecting comprising detecting that the user input includes sequential multi-touch input; and
said associating includes associating numbers with each multi-touch input of the sequential multi-touch input.

5. The method of claim 4, wherein said performing a comparison includes determining that the numbers associated with each multi-touch input occur in an expected sequence.

6. The method of claim 1, wherein:
said detecting comprising detecting that the user input includes a location component; and
said performing a comparison includes matching the location component with an expected location component.

7. The method of claim 1, wherein the detecting comprises detecting at least one multi-touch input selected from the group of inputs consisting of a swipe, a tap, and a press and hold.

8. The method of claim 7, wherein the detected swipe comprises a directional swipe.

9. The method of claim 8, wherein the detected, directional swipe is selected from the group consisting of a pinch gesture and a zoom gesture.

10. The method of claim 1, wherein:
said detecting comprising detecting that the user input includes a temporal component; and
said performing includes matching the temporal component with an expected temporal component.

11. An information handling device, comprising:
a touch sensitive surface that accepts user input;
a processor; and
a memory device that stores instructions accessible to the processor, the instructions being executable by the processor to:
detect, at the touch sensitive surface, user input including at least one multi-touch input;
wherein to detect comprises detecting two or more concurrent user inputs to the touch sensitive surface;
associate a number with the at least one multi-touch input, the number being chosen based on the number of concurrent user inputs;
thereafter perform a comparison of a sequence of numbers associated with a sequence of concurrent user inputs and a predetermined sequence of numbers; and
providing, responsive to determining a match based on the comparison, an authentication of a user.

12. The information handling device of claim 11, wherein:
to detect comprises detecting that the user input includes a directional component; and
to perform a comparison includes matching the directional component with an expected directional component.

13. The information handling device of claim 11, wherein:
to detect comprises detecting that the user input includes a force component; and
to perform a comparison includes matching the force component with an expected force component.

14. The information handling device of claim 11, wherein:
to detect comprises detecting that the user input includes sequential multi-touch input; and
to associate includes associating numbers with each multi-touch input of the sequential multi-touch input.

15. The information handling device of claim 14, wherein to perform a comparison includes determining that the numbers associated with each multi-touch input occur in an expected sequence.

16. The information handling device of claim 11, wherein:
to detect comprises detecting that the user input includes a location component; and
to perform a comparison includes matching the location component with an expected location component.

17. The information handling device of claim 11, wherein the detecting comprises detecting at least one multi-touch input selected from the group of inputs consisting of a swipe, a tap, and a press and hold.

18. The information handling device of claim 17, wherein the detected swipe comprises a directional swipe.

19. The information handling device of claim 18, wherein the detected, directional swipe is selected from the group consisting of a pinch gesture and a zoom gesture.

20. A product, comprising:
a storage device having processor executable code stored therewith, the code comprising:
code that detects, at a touch sensitive surface of an information handling device, user input including at least one multi-touch input;
wherein to detect comprises detecting two or more concurrent user inputs to the touch sensitive surface;
code that associates, using a processor, a number with the at least one multi-touch input, the number being chosen based on the number of concurrent user inputs;
code that thereafter performs, using the processor, a comparison of a sequence of numbers associated with a sequence of concurrent user inputs and a predetermined sequence of numbers; and
code that provides, responsive to determining a match based on the comparison, an authentication of a user.

* * * * *